(12) United States Patent
Tennant et al.

(10) Patent No.: US 12,726,120 B2
(45) Date of Patent: Sep. 1, 2026

(54) ON-TIME STABILITY FOR CURRENT MODE CONTROL CONVERTER

(71) Applicant: TEXAS INSTRUMENTS INCORPORATED, Dallas, TX (US)

(72) Inventors: Daniel Tennant, Phoenix, AZ (US); Ahmed E Hashim, Gilbert, AZ (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 266 days.

(21) Appl. No.: 18/171,846

(22) Filed: Feb. 21, 2023

(65) Prior Publication Data

US 2024/0258915 A1 Aug. 1, 2024

Related U.S. Application Data

(60) Provisional application No. 63/441,639, filed on Jan. 27, 2023.

(51) Int. Cl.
*H02M 3/158* (2006.01)
*H02M 3/157* (2006.01)

(52) U.S. Cl.
CPC .......... *H02M 3/157* (2013.01); *H02M 3/158* (2013.01)

(58) Field of Classification Search
CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24;
(Continued)

(56) References Cited

U.S. PATENT DOCUMENTS 3,364,366 A 1/1968 Dryden
10,790,746 B2 * 9/2020 Acar .................. H02M 3/1588
(Continued)

FOREIGN PATENT DOCUMENTS

CN 114665712 A 6/2022

OTHER PUBLICATIONS

Anunciada V et al: "New Constant-Frequency Current-Mode Control for Power Converters, Stable for All Values of Duty Ratio, and Usable in All Four Quadrants", IEEE Transactions on Industrial Electronics, IEEE Service Center, Piscataway, NJ, USA, vol. 37, No. 4, Aug. 1, 1990 (Aug. 1, 1990), pp. 323-325.
Chen Jiann-Jong et al: "A Dead-Beat-Controlled Fast-Transient-Response Buck Converter With Active Pseudo-Current-Sensing Techniques", IEEE Transactions on Very Large Scale Integration (VLSI) Systems, IEEE Service Center, Piscataway, NJ, USA, vol. 27, No. 8, Aug. 1, 2019 (Aug. 1, 2019), pp. 1751-1759.
(Continued)

*Primary Examiner* — Jeffrey A Gblende
(74) *Attorney, Agent, or Firm* — Charles F. Koch

(57) ABSTRACT

A voltage converter includes a power stage, a compensator circuit, and a modulator circuit. The power stage circuit has an input voltage terminal, an output voltage terminal, and a pulse width modulation (PWM) control input. The compensator circuit has a voltage input coupled to the output voltage terminal and has a compensation output. The modulator circuit has a compensation voltage input and a PWM control output. The compensation voltage input is coupled to the compensation output, and the PWM control output is coupled to the PWM control input. The modulator circuit includes a slope compensation ramp generator circuit that is configured to generate a slope compensation voltage ramp having a slope that decreases during at least a portion of a switching cycle.

20 Claims, 6 Drawing Sheets

(58) Field of Classification Search
CPC .......... G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS 12,119,746 B2 * 10/2024 Borghese ............ H02M 1/0025
12,126,256 B2 * 10/2024 Huang .................. H02M 3/158
2013/0027996 A1 1/2013 Bäurle
2022/0085717 A1 * 3/2022 Hung .................. H02M 1/0025
2022/0326724 A1 10/2022 Zhang et al.

OTHER PUBLICATIONS

Toshiya Yoshida et al: "An Improvement Technique for the Efficiency of High-Frequency Switch-Mode Rectifiers", IEEE Transactions on Power Electronics, Institute of Electrical and Electronics Engineers, USA, vol. 15, No. 6, Nov. 1, 2000 (Nov. 1, 2000).

* cited by examiner

FIG. 1

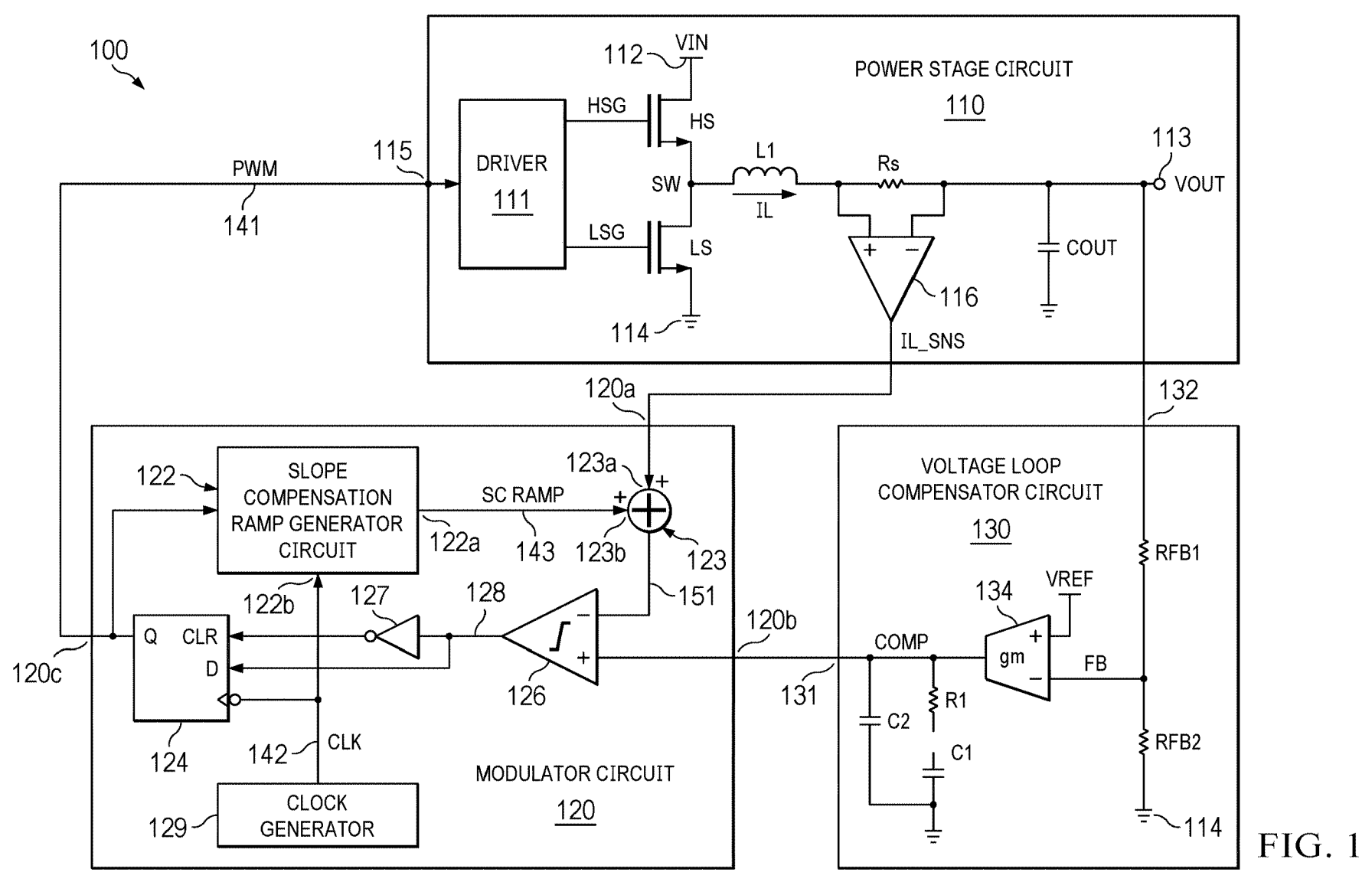

100
POWER STAGE CIRCUIT
110
VOUT
113
COUT
Rs
116
IL_SNS
L1
IL
VIN
112
HS
SW
LS
114
HSG
LSG
DRIVER
111
115
PWM
141
132
RFB1
RFB2
114
VOLTAGE LOOP
COMPENSATOR CIRCUIT
130
VREF
FB
134
gm
COMP
R1
C1
C2
131
120b
120a
123
151
123a
123b
SC RAMP
143
126
MODULATOR CIRCUIT
120
128
122a
SLOPE
COMPENSATION
RAMP GENERATOR
CIRCUIT
127
CLK
142
122b
CLOCK
GENERATOR
129
CLR
D
Q
124
122
120c

ON-TIME STABILITY FOR CURRENT MODE CONTROL CONVERTER

CROSS REFERENCE TO RELATED APPLICATION

This application claims priority to U.S. Provisional Application No. 63/441,639, filed Jan. 27, 2023 entitled "Stable Minimum On-Time Improvement Technique for Current Mode Control Systems," incorporated herein by reference.

BACKGROUND

A voltage converter converts and input voltage at one magnitude to an output voltage at a different magnitude, either larger than or less than the magnitude of the input voltage. One type of voltage converter is a switching voltage converter in which a modulator controls the ON and OFF timing of one or more power transistors in a power stage to regulate the output voltage. Some switching converters include slope compensation to help improve the stability of the converter.

SUMMARY

In at least one example, a voltage converter includes a power stage, a compensator circuit, and a modulator circuit. The power stage circuit has an input voltage terminal, an output voltage terminal, and a pulse width modulation (PWM) control input. The compensator circuit has a voltage input coupled to the output voltage terminal and has a compensation output. The modulator circuit has a compensation voltage input and a PWM control output. The compensation voltage input is coupled to the compensation output, and the PWM control output is coupled to the PWM control input. The modulator circuit includes a slope compensation ramp generator circuit that is configured to generate a slope compensation voltage ramp having a slope that decreases during at least a portion of a switching cycle.

BRIEF DESCRIPTION OF THE DRAWINGS

FIG. 1 is a schematic of a switching voltage converter that includes a slope compensation ramp generator circuit, in an example.

DETAILED DESCRIPTION

Figure 2:
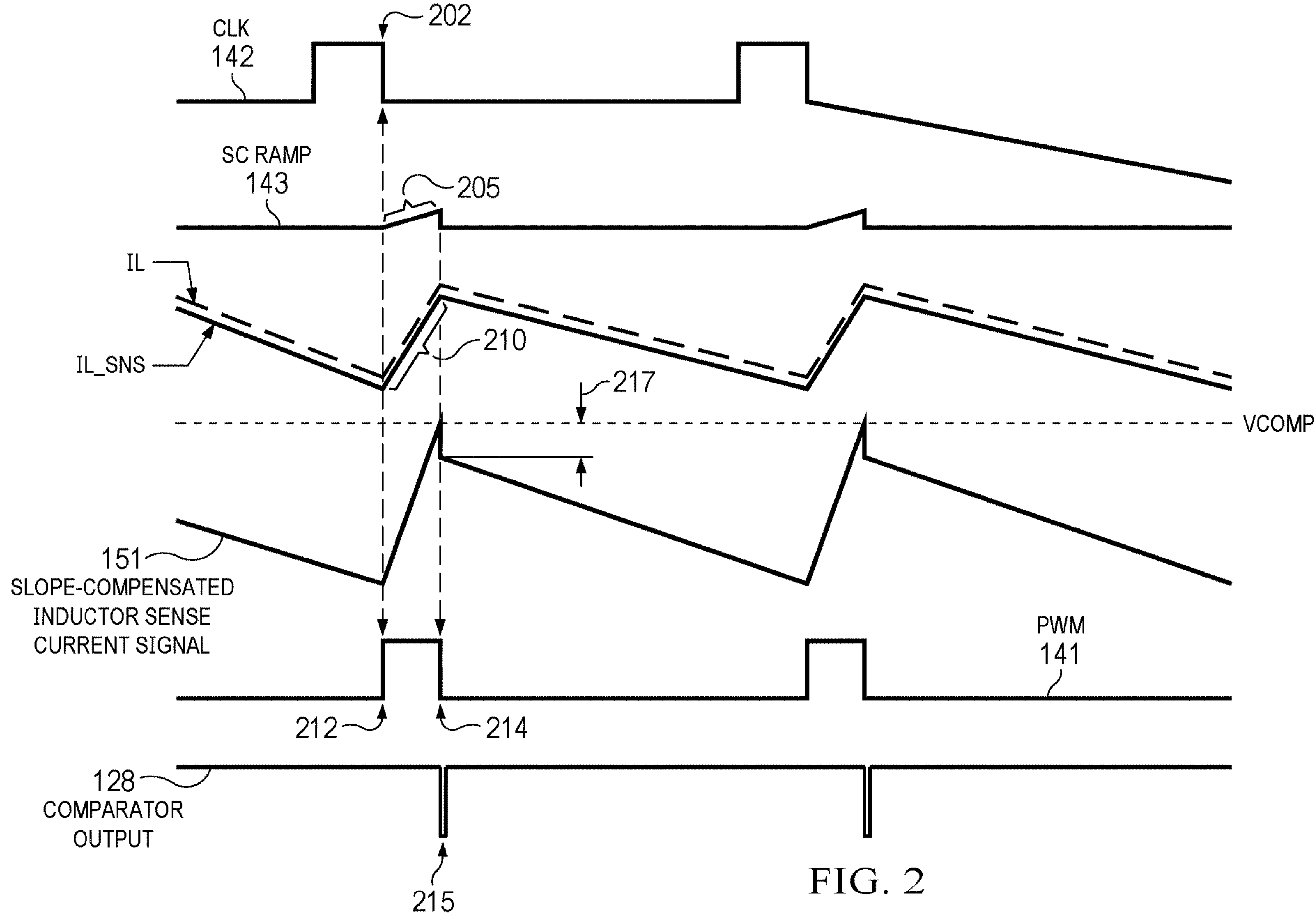
FIG. 2 are example ideal waveforms of signals within the switching voltage converter of FIG. 1.

The same reference numbers or other reference designators are used in the drawings to designate the same or similar (either by function and/or structure) features.

FIG. 1 is a schematic of an example switching voltage converter 100 which includes a power stage circuit 110, a modulator circuit 120, and a voltage loop compensator circuit 130. The power stage circuit 110 includes a driver 111, a high side (HS) transistor, a low side (LS) transistor, an inductor L1, a resistor Rs, a capacitor COUT, and an amplifier 116. In this example, the HS and LS transistors are n-channel field effect transistors (NFETs), although either or both of the HS and LS transistors can be implemented as other types of transistors. The HS and LS transistors are coupled in series between a voltage input terminal 112 and a reference terminal 114 (e.g., ground). One terminal of inductor L1 is coupled to the source of the HS transistor and to the drain of the LS transistor at a switching (SW) node. The other terminal of the inductor L1 is coupled to the resistor Rs. The resistor Rs is a relatively low resistance (e.g., 0.1 ohm) resistor which functions as a sense resistor to sense the current IL through inductor L1. The current through resistor Rs produces a voltage across resistor Rs. The magnitude of the voltage is the product of the current Il and the resistance of resistor Rs. The voltage across resistor Rs, which is proportional to current IL is amplified by amplifier 116 to produce an inductor current sense signal, IL_SNS. The capacitor COUT is coupled to the terminal of resistor Rs opposite the resistor's terminal that is coupled to inductor L1. The voltage across capacitor COUT produces an output voltage VOUT at a voltage output terminal 113. The driver 111 receives a pulse width modulation (PWM) signal 141 on a PWM control input 115 of the power stage circuit 110 from the modulator circuit 120. Responsive to the PWM signal 141, the driver 111 asserts gate signals HSG and LSG to the gates, respectively, of the HS and LS transistors.

The voltage loop compensator circuit 130 includes a voltage input 132 which is coupled to the voltage output terminal 113. The voltage loop compensator circuit 130 also has a compensation output 131. The voltage loop compensator circuit 130 includes resistors RFB1, RBF2, and R1, capacitors C1 and C2, and a transconductance amplifier 134. Resistors RFB1 and RBF2 are coupled in series between the voltage input 132 and the reference terminal 114. The resistors RFB1 and RBF2 form a voltage divider to produce a feedback voltage FB, which is scaled version of the output voltage VOUT (FB is VOUT×RFB2/(RFB1+RFB2). The transconductance amplifier 134 has a positive (+, non-inverting) input and a negative (−, inverting) input. The negative input is coupled to connection between resistors RFB1 and RFB2 to thereby receive the feedback voltage FB. A reference voltage VREF is coupled to the positive input. Resistors R1 and C1 are coupled in series between the output of the transconductance amplifier 134 and the reference terminal 114. Capacitor C2 is coupled in parallel with the series combination of resistor R1 and capacitor C1. The voltage on the output of the transconductance amplifier 134 is the compensation voltage (COMP), which is provided at the compensation output 131 of the voltage loop compensator circuit 130. The transconductance amplifier 134 amplifies the difference between VREF and FB and thus the COMP signal is an error signal representing the difference between the present level of the output voltage VOUT (via its proxy FB) and VREF.

The modulator circuit 120 has and inputs 120, a compensation voltage input 120*b*, and PWM control output 120*c*. The output of amplifier 116 within the power stage circuit 110 is coupled to input 120*a*, and the output of the transconductance amplifier 134 in the voltage loop compensator circuit 130 is coupled to input 120*b*. The modulator circuit 120 includes a slope compensation ramp generator circuit 122, a data (D) flip-flop 124, a summer 123, a comparator 126, an inverter 127, and a clock generator 129. The summer 123 has inputs 123*a* and 123*b*. The input 120*a* of the modulator circuit 120 is coupled to the summer's input 123*a*. Accordingly, the output of amplifier 116, which generates the inductor current sense signal IL_SNS, is coupled to input 123*a* of the summer 123. The slope compensation ramp generator circuit 122 has an output 122*a*, which is coupled to the other input 123*b* of summer 123. The slope compensation ramp generator circuit 122 generates a slope compensation (SC) ramp signal 143 on its output 122*a* which is provided to the input 123*b* of summer 123.

The comparator 126 has a positive input, a negative input, and an output. The output of summer 123 is coupled to the negative input of comparator 126. The input 120*b* of the modulator circuit 120 is coupled to the positive input of the comparator 126. Accordingly, the output of the transconductance amplifier 134, which generates the signal COMP, is coupled to the positive input of comparator 126. The output of comparator 126 is coupled to an input of inverter 127.

In this example, the D flip-flop 124 includes a D input, a clear (CLR) input, a clock input (inverted), and a Q output. The output of inverter 127 is coupled to the CLR input. The clock generator 129 generates a clock signal (CLK) 142 on its output, and the output of the clock generator 129 is coupled to the inverted clock input of the D flip-flop 124 and to a clock input 122*b* of the slope compensation ramp generator circuit 122. The output of comparator 126 is coupled to the D input of flip-flop 124. The D flip-flop 124 generates the PWM signal 141 on its output 120*c*.

To help improve the stability of the switching voltage converter 100, the slope compensation ramp generator circuit 122 generates the SC ramp signal 143, which is added to the inductor current sense current signal IL_SNS from amplifier 116 by summer 123 to produce a slope-compensated inductor sense current signal 151. The slope-compensated inductor sense current signal 151 is compared to COMP from the voltage loop compensator circuit 130. Comparator 126 asserts its output signal 128 to a logic high state responsive to COMP being larger than the slope-compensated inductor sense current signal 151. Comparator 126 asserts its output signal 128 to a logic low state responsive to the slope-compensated inductor sense current signal 151 being larger than COMP. The comparator's output signal 128 is logically inverted by inverter 127, and the logical inverse of the comparator's output signal is provided to the CLR input of D flip-flop 124.

Before the start of a switching cycle, the HS transistor will be OFF and thus COMP will be larger than the slope-compensated inductor sense current signal 151, and thus the comparator's output signal 128 will be logic high. Responsive to a falling edge of CLK 142, the D flip-flop causes its Q output to transition to the same logic level as its D input, which is the logic level of the comparator's output signal 128 (logic high). The Q output is thus forced high, and the driver 111 responds by turning ON the HS transistor. With the HS transistor ON, current flows from VIN through the HS transistor and inductor L1 to supply the current to a load (not shown) and to charge capacitor COUT. The current IL through the inductor L1 increases while the HS transistor is ON.

In this example, the modulator 120 implements peak mode current control in which the slope-compensated inductor sense current signal 151 is compared to COMP. The comparator 126 trips (its output signal changes from logic high to low) when the slope-compensated inductor sense current signal 151 reaches COMP. Responsive to a logic low for the comparator's output signal 128 (logic high from inverter 127), the D flip-flop 124 is cleared and forces its Q output to a logic low level thereby causing driver 111 to turn OFF the HS transistor and, after a short dead-time, turn ON the LS transistor.

FIG. 2 illustrates example waveforms of signals within the switching voltage converter 100 of FIG. 1. These waveforms are "ideal" waveforms, and in practice some of these waveforms have different shapes and timing as described below with regard to FIG. 3. The waveforms in FIG. 2 include CLK 142, the SC ramp signal 143, IL_SNS slope-compensated inductor sense current signal 151, PWM 141, and the comparator's output signal 128. Each clock CLK 142 falling edge triggers the start of a switching cycle in which the HS transistor turns ON and the SC ramp signal 143 begins to increase linearly as shown at 205. In other examples, the rising edges of CLK 142 may initiate the switching cycles. The SC ramp signal 143 starts ramping up upon occurrence of the falling edge 202 of CLK 142. In this ideal example, no delay is assumed in the slope compensation ramp generator circuit 122 between occurrence of the clock's falling edge 202 and the beginning of the SC ramp signal 143.

With the HS transistor ON, the inductor current IL and the inductor current sense signal IL_SNS increase linearly as shown at 210. These ideal waveforms assume the bandwidth of amplifier 116 is infinitely high, and thus the inductor current sense signal IL_SNS is able to track the inductor current IL perfectly, that is, with no delay. The slope-compensated inductor sense current signal 151 is the sum (per summer 123) of the SC ramp signal 143 and the inductor current sense signal IL_SNS. The PWM signal 141 is asserted to the logic high state at rising edge 212 by the falling edge 202 of CLK 142 clocking D flip-flop 124. The D flip-flop 124 forces the PWM signal 141 to the logic state at falling edge 214 in response to comparator 126 asserting its output signal 128 in response to the slope-compensated inductor current sense signal 151 reaching the level of COMP. The comparator's output signal 128 is normally logic high because COMP is normally higher than the slope-compensated inductor current sense signal 151. The comparator 126 forces its output signal 128 logic flow for a small period of time 215 because as soon as the comparator 126 forces its output signal 128 logic low, the driver 111 (implementing a small dead time) turns ON the LS transistor and the inductor current IL, and the inductor current sense signal IL_SNS immediately begins to decrease thereby causing the slope-compensated inductor current sense signal 151 to be smaller than VCOMP. The step down 217 in the slope-compensated inductor current sense signal 151 is equal to the magnitude of the SC ramp signal 143 when the LS transistor turns ON and is due to immediately resetting the slope compensation ramp 143 upon PWM transitioning to logic low in order to prepare the slope compensation ramp for the next clock cycle.

Figure 3:
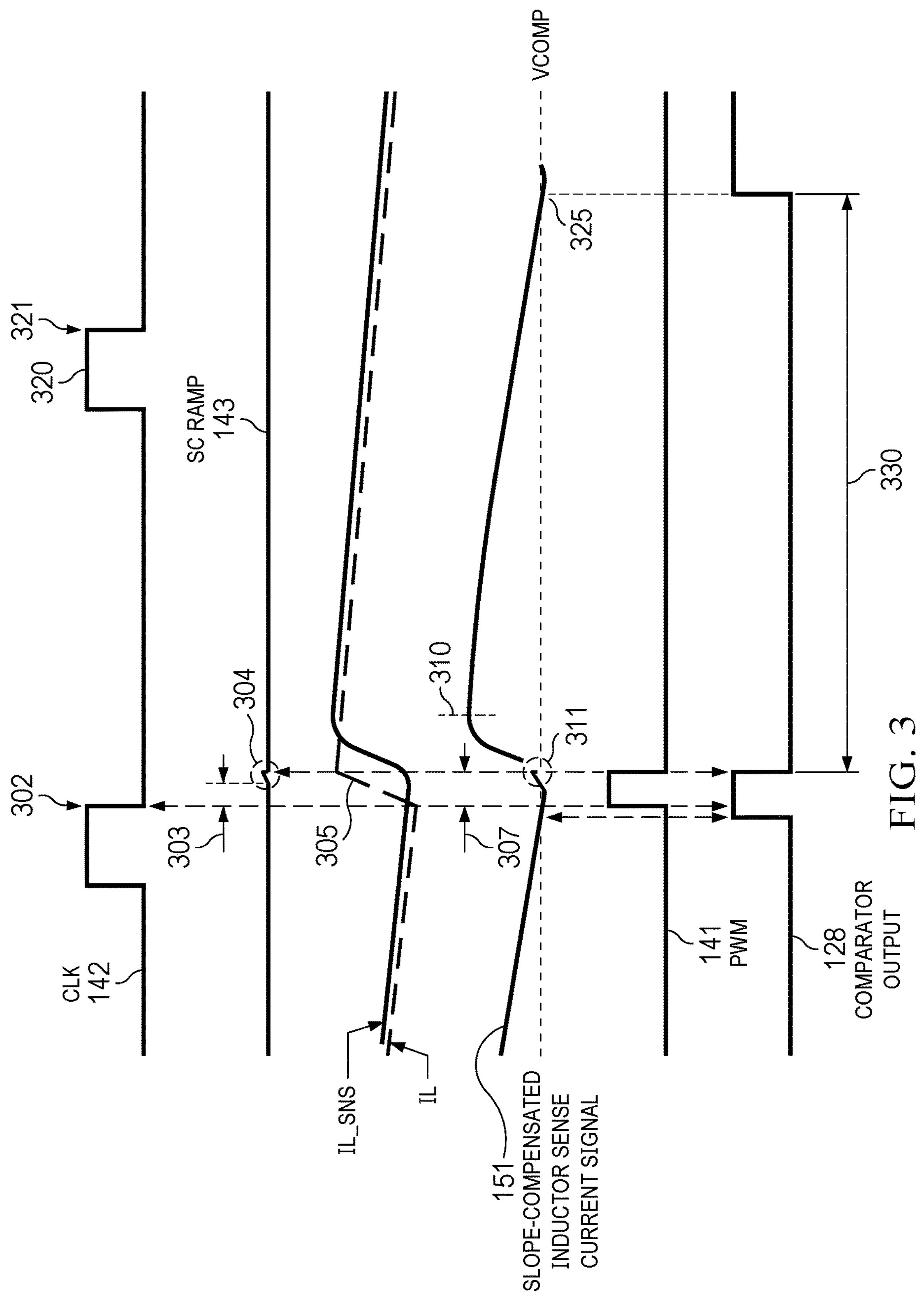
FIG. 3 are waveforms of signals within the switching voltage converter in which at least some of the waveforms illustrate non-ideal behavior of the switching voltage converter.

FIG. 3 includes waveforms of the same signals as in FIG. 2, but the waveforms of FIG. 3 reflect delay inherent to amplifier 116 and the slope compensation ramp generation circuit 122. In response to the falling edge 302 of CLK 142, the modulation circuit 120 causes the HS transistor to turn ON at the beginning of the switching cycle. The SC ramp signal 143 in the example of FIG. 3 does not immediately begin to increase upon falling edge 302 due to propagation delays in the slope compensation generation circuit 122. Instead, the SC ramp signal begins to increase at 304 after a delay 303 following the clock's falling edge 302. Further, upon the HS transistor being turned ON, the inductor current IL immediately begins to increase as shown at 305. However, due to the limited bandwidth of amplifier 116, the inductor current sense signal IL_SNS has a delay 307 relative to inductor current IL. During the delay period 307, IL_SNS, in this example, is still decreasing while IL is increasing.

As described above, the switching voltage converter 100 implements peak mode current control based on a comparison of VCOMP to the sum of IL_SNS and the SC ramp signal 143. During the delay period 307 in the example of FIG. 3, the SC ramp signal has not started to ramp up (or has only barely started to ramp up). Further, IL_SNS (which is still decreasing) does not accurately reflect the inductor current IL (which is increasing). Accordingly, the sum of IL_SNS and the SC ramp signal 143 during this initial portion of the switching cycle, just after the HS transistor has been turned ON, does not include accurate signal information to use for the peak mode current control to determine when to turn OFF the HS transistor and turn ON the LS transistor.

Additionally, as a result of IL_SNS having a delay relative to IL due to the limit of the bandwidth of the amplifier 116, when the slope-compensated inductor sense current signal 151 eventually does begin to decrease (point 310 in the waveform), it is possible that the slope-compensated inductor sense current signal 151 will not reach VCOMP until after the next clock pulse 320, as indicated at 325. During the time 330 that the slope-compensated inductor sense current signal 151 is higher than VCOMP, the output signal 128 from comparator 126 is logic low. With the comparator's output signal 128 being logic low, the D flip-flop 124 is cleared thereby causing driver 111 to maintain the HS transistor in the OFF state. The cleared state of D flip-flop 124 is not released until the comparator's output signal becomes logic high at 325, but by that time the falling edge 321 of clock pulse 320 has already occurred and a switching cycle that would otherwise have been initiated by falling edge 321 is skipped. This phenomenon is referred to as "pulse skipping." Pulse skipping is particularly problematic for narrow PWM pulses.

Further, when the HS transistor turns OFF, the magnitude of the SC ramp signal 143 at that moment (a voltage referred to as VSLOPE) is very small (as indicated at 304) due the fact that ramp started after the propagation delay of the slope compensation ramp generation circuit 122 from the clock's falling edge 302. When the HS transistor turns OFF, the slope-compensated inductor sense current signal 151 experiences a step down in voltage at point 311 by an amount equal VRAMP. Because VSLOPE is very small in this example, the step down in the slope-compensated inductor sense current signal 151 also is very small, further increasing the likelihood that the slope-compensated inductor sense current signal 151 will not be able to fall below VCOMP by the time the next clock pulse 320 occurs.

Figure 4:
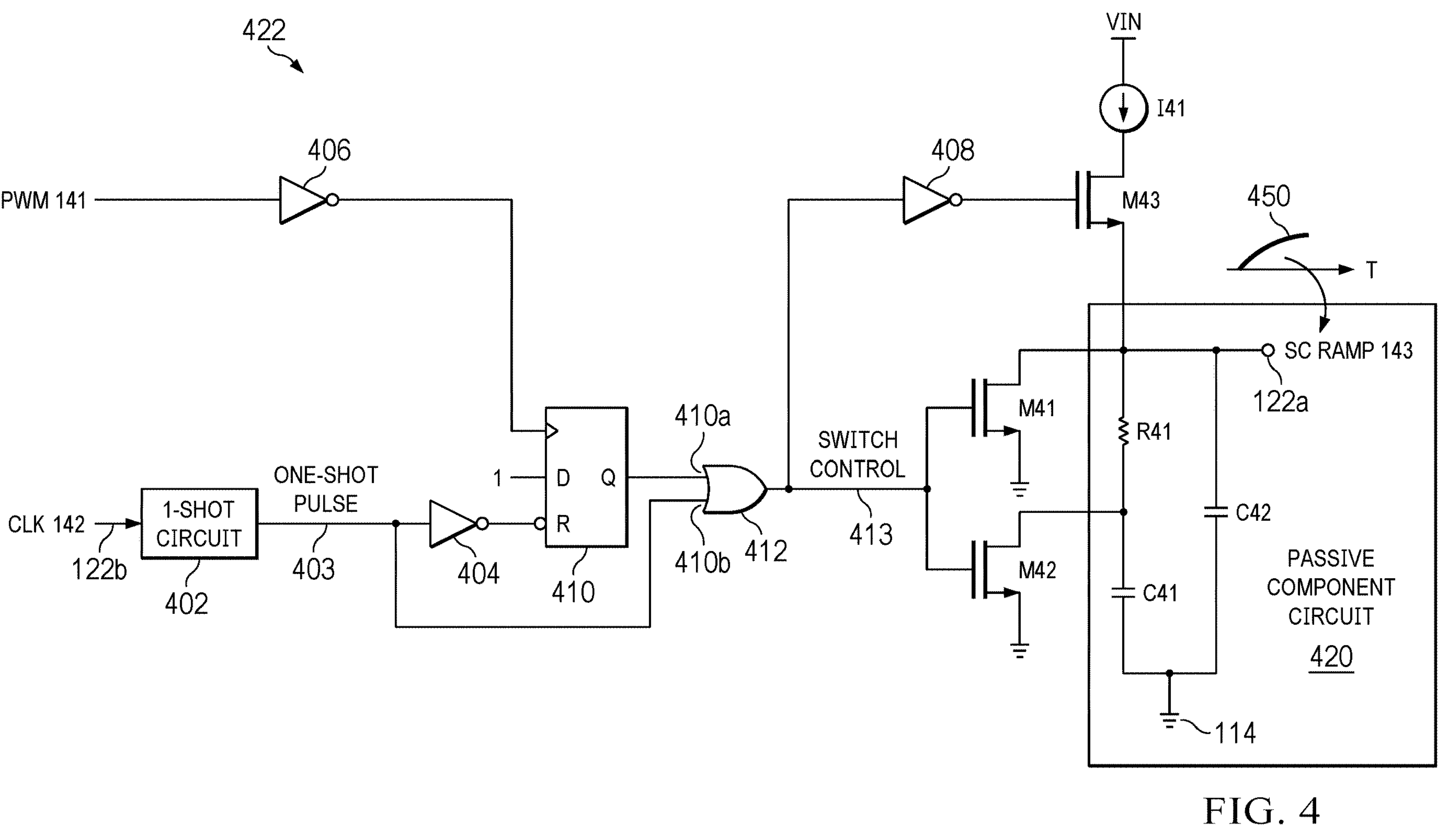
FIG. 4 is a schematic of a slope compensation ramp generator circuit which address the non-ideal behavior illustrated by the waveforms of FIG. 3.

FIG. 4 is a schematic diagram of a slope compensation ramp generation circuit 422 that addresses the problem described above. The slope compensation ramp generation circuit 422 can be used to implement the slope compensation ramp generation circuit 122 of FIG. 1. The slope compensation ramp generation circuit 422 initiates the SC ramp signal 143 to begin increasing before the falling edge of CLK 142 initiates the next switching cycle so that by the time the clock's falling edge occurs, the SC ramp signal has a sufficient slope, particularly given that IL_SNS may be delayed enough relative to IL so as not to be useful shortly after the clock's falling edge.

In the example of FIG. 4, the slope compensation ramp generation circuit 422 includes a one-shot circuit 402, inverters 404, 406, and 408, a latch 410, an OR gate 412, transistors M1, M2, and M3, a current source circuit I41, and a passive component circuit 420. The clock input 122*b* of the slope compensation ramp generation circuit 422 is coupled to an input of the one-shot circuit 402. The output of the one-shot circuit 402 is coupled to an input of inverter 402. The latch 410 includes a reset input (active logic low), a data (D) input, a clock input, and a Q output. The output of inverter 404 is coupled to the reset input of latch 410. The PWM signal 141 is coupled to an input of inverter 406, and the output of inverter 406 is coupled to the latch's clock input. The D input is tied to a logic high signal. The output of the one-shot circuit 402 is coupled to one input of OR gate 412, and the Q output of latch 410 is coupled to another input of OR gate 412. The example of FIG. 4 includes OR gate 412. Other examples may include alternative logic gates to OR gate 412 or additional types of logic gates coupled to OR gate 412.

In this example, transistors M41-M43 are NFETs but the transistors can be implemented as other types of transistors. Transistor M43 is coupled between current source circuit I41 and the passive component circuit 420. Turning OFF transistor M43 prevents current I41 from flowing into the passive component circuit 420. Turning ON transistor M43 allows current I41 to flow into the passive component circuit 420. The output of OR gate 412 is coupled to an input of inverter 408, and the output of inverter 408 is coupled to the gate of transistor M43. The output of OR gate 412 also is coupled to the gates of transistors M41 and M42. The example passive component circuit 420 of FIG. 4 includes a resistor R41 and capacitors C41 and C42. Resistor R1 and capacitor C41 are coupled in series between the source of transistor and the reference terminal 114. Capacitor C42 is coupled in parallel with the series combination of resistor R41 and capacitor C41. The connection between the source of transistor M43, resistor M41 and capacitor C42 is the output 122*a* of the slope compensation ramp generator circuit 122 on which the SC ramp signal 143 is generated.

The drain of transistor M41 is coupled to the current input and the source of transistor M41 is coupled to the reference terminal 114. Accordingly, transistor M41 is coupled across capacitor C42. The drain and source of transistor M42 are coupled across capacitor C42. When transistor M41 is ON, any charge present capacitor C42 is discharged through transistor M41 to ground. When transistor M42 is ON, any charge present capacitor C41 is discharged through transistor M42 to ground.

The output signal 413 from OR gate 412 is labeled the "switch control" signal. When switch control signal 413 is logic high in this example, transistors M41 and M42 turn ON thereby discharging capacitors C42 and C41, respectively, and transistor M43 turns OFF (due to inverter 408) thereby turning OFF current I41 from flowing into the passive component circuit 420. When switch control signal 413 is logic low, transistors M41 and M42 turn OFF and transistor M43 turns ON. With transistor M43 ON, current I41 flows into the passive component circuit 420. As further described below, the shape of the SC ramp signal 143 generated by the passive component circuit 420 is illustrated at 450. The shape of the SC ramp signal 143 is a slope that, for at least a portion of each switching cycle, decreases over time as current I41 continues to flow into the passive component circuit 420. The slope smoothly decreases over time (e.g., no sharp discontinuities).

Referring still to FIG. 4, the one-shot circuit 402 responds to a rising edge of CLK 142 by outputting a fixed duration one-shot pulse 403. The one-shot circuit 402 outputs the one-shot pulse 403 with a pulse width that is smaller than the pulse width of the input clock CLK 142. In one example, the width of the one-shot pulse 403 is 20 nanoseconds. The logical inverse (via inverter 404) of the one-shot pulse 430 from the one-shot circuit 402 is provided to the reset input of the latch 410 and causes the latch's Q output to input 410*a* of the OR gate 412 to be logic low. The one-shot pulse 403 also bypasses inverter 404 and latch 410 and is provided to input 410*b* of OR gate 412. Accordingly, during the time that the one-shot pulse 403 is logic high, the switch control signal 413 is logic high, and transistors M41 and M42 are ON and transistor M43 is OFF. In this state, capacitors C41 and C42 discharge through their respective transistors M42 and M41, and current I41 does not flow into the passive component circuit 420.

At the end of the one-shot pulse 403, input 410*b* of OR gate 412 becomes logic low thereby turning OFF transistors M41 and M42 and turning ON transistor M43. Further, with one-shot pulse 403 now in a logic low level, the reset input of latch 410 is logic high thereby ceasing the reset state of latch 410. With transistor M43 ON and transistors M41 and M42 OFF, current I41 flows into the passive component circuit 420 and the SC ramp signal 143 ramps up initially with a relatively large slope (and then with a progressively decreasing slope).

When the next falling edge of the PWM signal 141 occurs (which occurs when the HS transistor is to be turned OFF), via inverter 406, the clock input of latch 410 receives a rising signal edge, and the latch 410 responds by clocking the logic high signal on its D input onto its Q output to input 410*a* of OR gate 412. The OR gate 412 responds by causing switch control signal 413 to be logic high again, which causes transistors M41 and M42 to be ON (discharging capacitors C42 and C41) and transistor M43 to be OFF (turning OFF current I41 to the passive component circuit 420).

As described above, the slope compensation ramp generation circuit 422 causes the capacitors within the passive component circuit 420 (e.g., capacitors C41 and C42) to be discharged twice during each switching cycle. The first time is triggered by the rising edge of the CLK 142 pulse and before the switching cycle (to be initiated by the falling edge of CLK 143) begins. The second time that the capacitors are discharged occurs coincident with the decision point at which the HS transistor is turned OFF. At that point, the modulator circuit 120 uses the slope-compensated inductor sense current signal 151 (e.g., compares the slope-compensated inductor sense current signal 151 to VCOMP) to decide when the HS transistor should be turned OFF. Once that occurs, there is no need to continue using quiescent current to continue generating the SC ramp signal 143, and thus latch 410 and logic gate 412 shuts off current I41 to the passive component circuit 420 and discharges capacitors C41 and C42. Discharging capacitors C41 and C42 as soon as possible after a decision has been made to turn OFF the HS transistor also helps to ensure that the ramp is fully discharged before the start of the next clock cycle.

Figure 5:
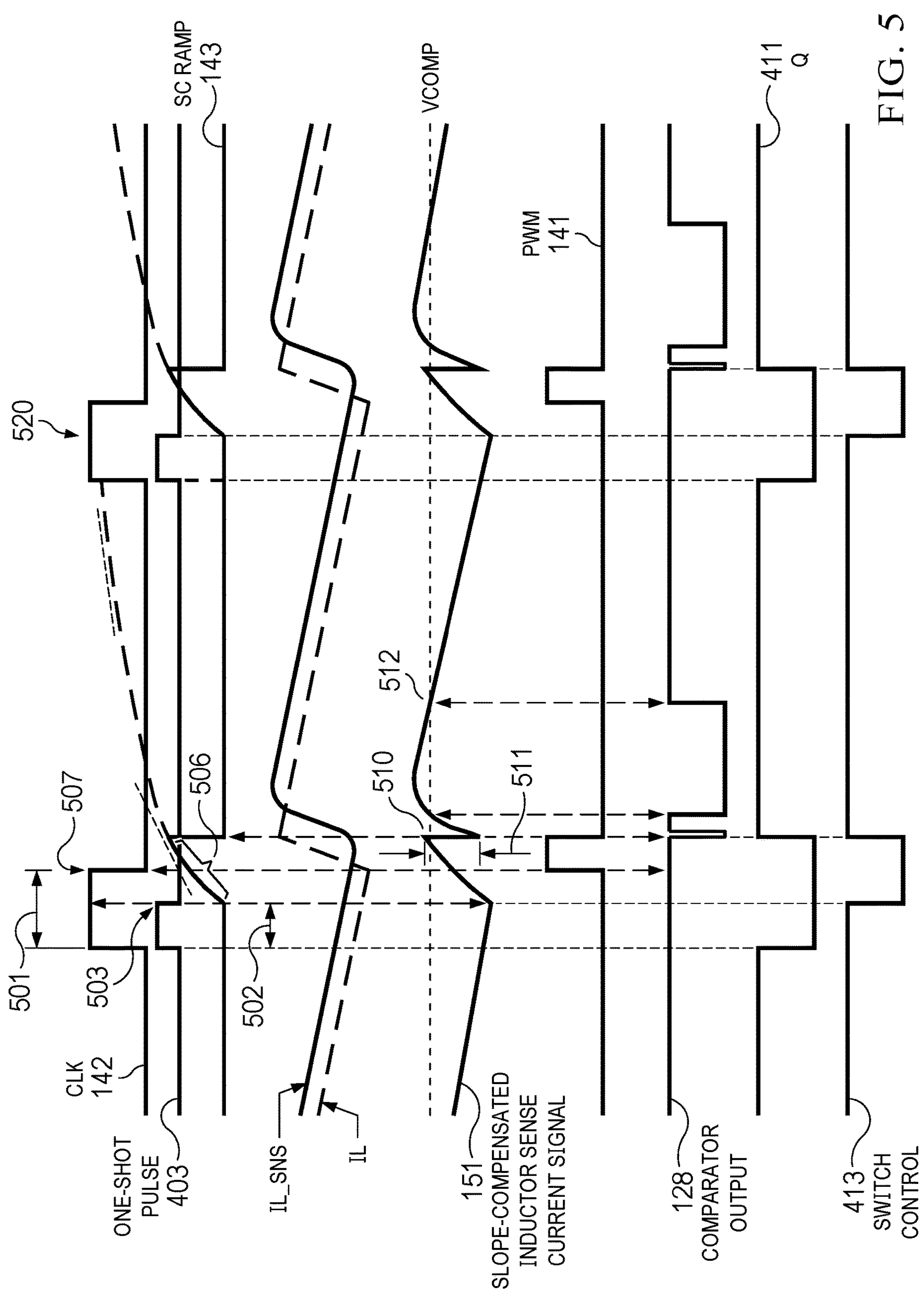
FIGS. 5 and 6 are waveforms of signals within the switching voltage converter of FIG. 4, in an example.

FIG. 5 shows example waveforms for the switching voltage converter 100 in which the slope compensation ramp generation circuit 422 is used. The waveforms include CLK 142, inductor current IL, and the inductor current sense signal IL_SNS, as described above. The waveforms also include an example of the one-shot pulse 403 generated by the one-shot circuit 402. As shown in the example of FIG. 5, the width 502 of the one-shot pulse 403 is smaller than the width 501 of the clock pulse. The falling edge 503 of the one-shot pulse 403 starts the phase in which transistor M43 is ON and transistors M41 and M42 are OFF thereby causing the SC ramp signal 143 to increase with an initial large slope that progressively decreases as shown at 506. The initial large slope of the SC ramp is present by the time that the falling edge 507 of CLK 142 occurs, which triggers the start of the switching cycle in which the HS transistor is turned ON. This heightened initial slope of the SC ramp signal 143 helps to ensure that the slope-compensated inductor sense current signal 151 has sufficient slope for COMP to linearly modulate the PWM on-time during very low on-times when the output of amplifier 116 is highly delayed. The larger initial slope provides a large amplitude slope compensated inductor current sense signal 151 that COMP can be compared with and smoothly modulate the PWM signal. This is in contrast to the small slope compensated inductor current sense signal (in the example of FIG. 3) where COMP has very little or no range that it can use to smoothly modulate the PWM on-time which results in jittery operation or pulse skipping during low on-times. With the large additional initial slope, the slope compensated ramp signal dominates the slope compensated inductor current and allows the PWM comparator 126 output to flip logic state when the slope compensation ramp is reset versus waiting for the inductor current signal to fall below the COMP voltage. Furthermore, a larger initial slope requires COMP to move further to produce changes in on-time which represents a decrease in loop gain thus stabilizing the loop response of the regulator when the sensed inductor current is delayed.

The output signal 128 of comparator 126 transitions briefly to the logic low level in response to the slope-compensated inductor sense current signal 151 reaching VCOMP (at point 510). When that occurs, the HS transistor is turned OFF, and the slope-compensated inductor sense current signal 151 experiences a step down 511 approximately equal to the voltage magnitude of the SC ramp signal at point 510. The size of the step down voltage 511 is larger in the example of FIGS. 4 and 5 because the slope compensation ramp generator circuit 122 in FIG. 4 starts the SC ramp signal before the falling edge of CLK 142 and thus before the start of the switching cycle and starts the SC ramp with a large slope than would have been the case if the slope compensation ramp generator had generated an SC ramp signal 143 with only a linear slope. As a result of the sudden step down in the slope-compensated inductor sense current signal 151, the magnitude of the slope-compensated inductor sense current signal 151 becomes smaller than VCOMP before the next clock pulse 520, which permits the modulator circuit 120 to initiate a switching cycle on the next pulse of CLK 142. Accordingly, pulse skipping does not occur with the inclusion of the slope compensation ramp generator circuit 122 of FIG. 4.

Figure 6:
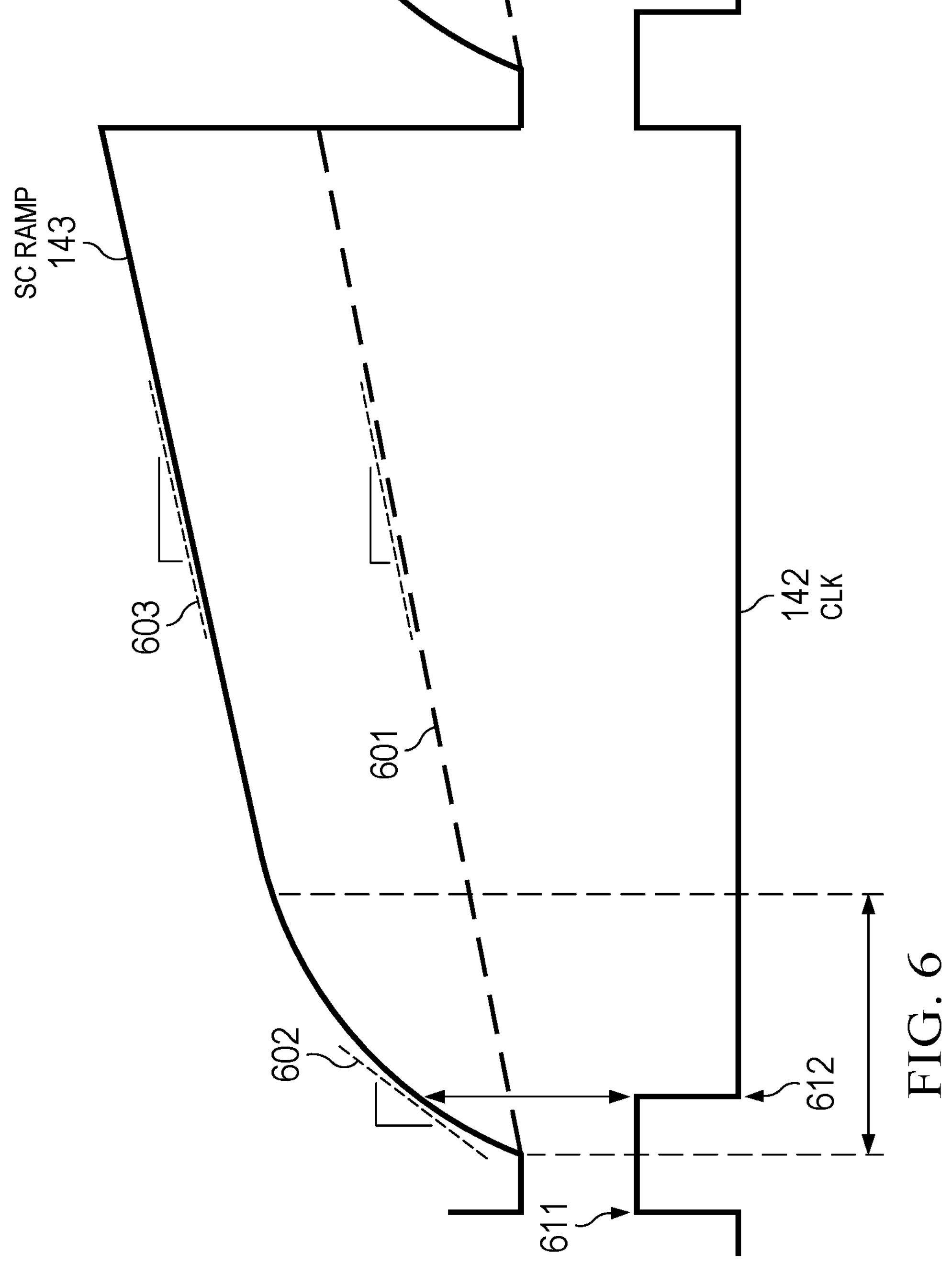

FIG. 6 shows the SC ramp signal 143 relative to a pulse of CLK 142. The dashed line 601 represents an example in which the SC ramp signal 143 is a linear ramp (constant slope). In the examples described herein, the SC ramp signal 143 generated by the slope compensation ramp generator circuit 122 begins with a larger slope 602 which progressively decreases, as illustrated by slope 603. The curved SC ramp signal 143 also begins between the rising edge 611 and falling edge 612 of the clock pulse (triggered by the falling edge of the one-shot pulse 403 as described above). Accordingly, by the time that the clock's falling edge 612 occurs, the slope 602 of the SC ramp signal 143 is larger than would have been the case with a linear SC ramp signal that begins with the falling edge 612 of the CLK 142 pulse and due to the limited bandwidth of amplifier 116.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

Also, in this description, the recitation "based on" means "based at least in part on." Therefore, if X is based on Y, then X may be a function of Y and any number of other factors.

A device that is "configured to" perform a task or function may be configured (e.g., programmed and/or hardwired) at a time of manufacturing by a manufacturer to perform the function and/or may be configurable (or reconfigurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) or a p-channel FET (PFET)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. An apparatus, comprising:

a power stage circuit having a power input and a control input;

an amplifier having a voltage input coupled to a power output and having an output; and a modulator circuit including:

a comparator having first and second inputs and an output, the first input coupled to the output of the amplifier; and a ramp generator circuit having a clock input and a second input, and having an output coupled to the second input of the comparator; and logic circuitry having a clock input, a second input and a control output, the second input coupled to the output of the comparator, the control output coupled to the control input and to the second input of the ramp generator circuit.

2. The apparatus of claim 1, wherein the ramp generator circuit includes:

a current source circuit having an output;

a resistor having a terminal coupled to the output of the current source circuit;

a first capacitor coupled in series with the resistor between the output of the current source circuit and a ground terminal; and a second capacitor having a first terminal coupled to the terminal of the resistor and having a second terminal coupled to the ground terminal.

3. The apparatus of claim 2, wherein the logic circuitry is first logic circuitry and the ramp generator circuit further includes:

a first switch having a control terminal, the first switch coupled between a terminal of the first capacitor and the ground terminal;

a second switch having a control terminal, the second switch coupled between the first terminal of the second capacitor and the ground terminal;

a third switch having a control terminal, the third switch coupled between the output of the current source circuit and the terminal of the resistor;

a one-shot circuit having the clock input and having an output; and second logic circuitry having a first input coupled to the control output, having a second input coupled to the output of the one-shot circuit, and having an output coupled to the control terminals of the first, second, and third switches.

4. An apparatus, comprising:

a power stage circuit having a power input and a control input; and a modulator circuit having an input and a control output, the input of the modulator circuit coupled to a power output, and the control output coupled to the control input, the modulator circuit including a ramp generator circuit capable of providing a ramp signal having multiple ramp slopes within a switching cycle, and the modulator circuit is capable of providing a control signal within the switching cycle responsive to a state of the power output and the ramp signal.

5. The apparatus of claim 4, wherein the ramp generator circuit including:

a one-shot circuit having an input and an output, the one-shot circuit capable of receiving a clock signal at its input and producing a one-shot pulse at its output, the one-shot pulse having a smaller width than a width of a pulse of the clock signal.

6. The apparatus of claim 5, wherein the ramp generator circuit further includes:

a current source circuit having an output;

a resistor having a terminal coupled to the output of the current source circuit;

a first capacitor coupled in series with the resistor between the output of the of the current source circuit and a ground terminal;

a second capacitor having a first terminal coupled to the terminal of the resistor and having a second terminal coupled to the ground terminal;

a first switch having a control terminal the first switch coupled between a terminal of the first capacitor and the ground terminal;

a second switch having a control terminal, the second switch coupled between the first terminal of the second capacitor and the ground terminal;

a third switch having a control terminal, the third switch coupled between the output of the current source circuit and the terminal of the resistor; and logic circuitry having a first input coupled to the control output, having a second input coupled to the output of the one-shot circuit, and having an output coupled to the control terminals of the first, second, and third switches.

7. The apparatus of claim 6, further comprising a clock generator having an output coupled to the input of the one-shot circuit, wherein the clock generator is capable of generating the clock signal.

8. An apparatus, comprising:

a power stage circuit having a power input and a control input;

an amplifier having an input and an output, the input of the amplifier coupled to a power output; and a modulator circuit having an input and a control output, the input of the modulator circuit coupled to the output of the amplifier, and the control output coupled to the control input, the modulator circuit including a ramp generator circuit capable of providing a ramp signal having multiple ramp slopes within a switching cycle, and the modulator circuit is capable of providing a control signal within the switching cycle responsive to a state of the output of the amplifier and the ramp signal.

9. The apparatus of claim 8, wherein the ramp generator circuit is capable of initiating the ramp signal before a start of the switching cycle and generating the ramp signal having a slope that decreases during at least a portion of the switching cycle.

10. The apparatus of claim 1, wherein the amplifier is a first amplifier, and the apparatus includes a second amplifier having an input coupled to the power output and having an output coupled to the second input of the comparator.

11. The apparatus of claim 8, wherein the ramp generator circuit includes:

a current source circuit having an output;

a passive component circuit;

switch circuitry having a switch control input, the switch circuitry coupled to the passive component circuit and the output of the current source circuit;

a one-shot circuit having a clock input and having an output;

a logic gate having first and second inputs and an output, the output of the one-shot circuit coupled to the second input of the logic gate, and the output of the logic gate coupled the switch control input of the switch circuitry; and a latch having a first input coupled to the control output, having a second input coupled to the output of the one-shot circuit, and having an output coupled to the first input of the logic gate.

12. The apparatus of claim 11, further comprising a clock generator coupled to the clock input of the one-shot circuit, wherein:

the clock generator is capable of producing a clock pulse having a pulse width; and the one-shot circuit is capable of producing an output one-shot pulse that has a pulse width smaller than the pulse width of the clock pulse.

13. The apparatus of claim 8, wherein the modulator circuit is capable of implementing peak mode current control of the power stage circuit.

14. An apparatus, comprising:

a power stage circuit having a power input and a control input;

a compensator circuit having an input coupled to a power output and having an output; and a modulator circuit having an input and a control output, the input of the modulator circuit coupled to the output of the compensator circuit, and the control output coupled to the control input, the modulator circuit including a ramp generator circuit that includes a one-shot circuit having a clock input and an output, the one-shot circuit capable of producing a one-shot pulse at its output responsive to a clock pulse having a pulse width at its input, the one-shot pulse having a smaller width than a width of the clock pulse.

15. The apparatus of claim 14, wherein the ramp generator circuit includes:

a current source circuit having an output;

a resistor having a terminal coupled to the output of the current source circuit;

a first capacitor coupled in series with the resistor between the output of the current source circuit and a ground terminal; and a second capacitor having a first terminal coupled to the terminal of the resistor and having a second terminal coupled to the ground terminal.

16. The apparatus of claim 15, wherein the ramp generator circuit further includes:

a first switch having a control terminal, the first switch coupled between a terminal of the first capacitor and the ground terminal;

a second switch having a control terminal, the second switch coupled between the first terminal of the second capacitor and the ground terminal; and a third switch having a control terminal, the third switch coupled between the output of the current source circuit and the terminal of the resistor.

17. The apparatus of claim 16, wherein the ramp generator circuit further includes logic circuitry having a first input coupled to the output of the one-shot circuit, having a second input coupled to the control output, and having an output coupled to the control terminals of the first, second, and third switches.

18. The apparatus of claim 14, further comprising:

a current source circuit having an output;

a resistor having a terminal coupled to the output of the current source circuit;

a first capacitor coupled in series with the resistor between the output of the current source circuit and a ground terminal;

a second capacitor having a first terminal coupled to the terminal of the resistor and having a second terminal coupled to the ground terminal;

a first switch having a control terminal, the first switch coupled between a terminal of the first capacitor and the ground terminal;

a second switch having a control terminal, the second switch coupled between the first terminal of the second capacitor and the ground terminal; and a third switch having a control terminal, the third switch coupled between the output of the current source circuit and the terminal of the resistor.

19. The apparatus of claim 18, further comprising:

a logic gate having first and second inputs and an output, the output of the one-shot circuit coupled to the second input of the logic gate, the output of the logic gate coupled to the control terminals of the first, second, and third switches; and a latch having a first input coupled to the control output, having a second input coupled to the control output, and having an output coupled to the first input of the logic gate.

20. The apparatus of claim 19, wherein the logic gate is an OR gate.

* * * * *